(12) United States Patent
Lin

(10) Patent No.: US 7,077,955 B1
(45) Date of Patent: Jul. 18, 2006

(54) JOINT USED IN ONE OF A WATER INLET OR WATER OUTLET OF A FILTER CYLINDER OR A FILTER CASING

(76) Inventor: Mao-Chang Lin, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 11/124,960

(22) Filed: May 10, 2005

(51) Int. Cl.
*B01D 27/08* (2006.01)
*B01D 35/30* (2006.01)

(52) U.S. Cl. ............... 210/232; 210/440; 210/444; 285/39; 285/321; 285/340; 285/390; 285/417

(58) Field of Classification Search ............... 210/232, 210/440, 444; 285/39, 321, 340, 390, 417
See application file for complete search history.

(56) References Cited

U.S. PATENT DOCUMENTS

| | | | | |
|---|---|---|---|---|
| 3,055,503 A | * | 9/1962 | Oliver | 210/238 |
| 3,904,527 A | * | 9/1975 | Wilhelmson et al. | 210/198.2 |
| 3,910,307 A | * | 10/1975 | Jankowski | 137/515.3 |
| 3,926,815 A | * | 12/1975 | McClory | 210/424 |
| 3,950,251 A | * | 4/1976 | Hiller | 210/232 |
| 4,309,287 A | * | 1/1982 | Roos et al. | 210/247 |
| 4,331,540 A | * | 5/1982 | Witsoe | 210/646 |
| 4,846,506 A | * | 7/1989 | Bocson et al. | 285/4 |
| 4,981,586 A | * | 1/1991 | Bartholomew | 210/435 |
| 5,269,571 A | * | 12/1993 | Haggard | 285/305 |
| 5,865,996 A | * | 2/1999 | Reid | 210/232 |
| 5,882,511 A | * | 3/1999 | Blomquist | 210/167 |
| 5,885,450 A | * | 3/1999 | Reid | 210/232 |

* cited by examiner

*Primary Examiner*—Thomas M. Lithgow

(57) ABSTRACT

A joint used in one of a water inlet or water outlet of a filter cylinder, or a water inlet or a water outlet of a filter casing is disclosed. The joint is a round cylindrical tube and comprises at least one first waterproof washer installed near one end of the round cylindrical tube; an outer thread on an outer surface of the round cylindrical tube and behind the waterproof washer; an opening away from the washer is a round opening and an interior of the round cylindrical tube is formed as a polygonal hole; a front end of the T shape sleeve have a plurality of tapered claws the waterproof washer encloses the front end of the T shape sleeve so as to be expanded by the tapered claws; thereby the round cylindrical tube; and a water tube.

1 Claim, 4 Drawing Sheets

JOINT USED IN ONE OF A WATER INLET OR WATER OUTLET OF A FILTER CYLINDER OR A FILTER CASING

FIELD OF THE INVENTION

The present invention relates to joints, and in particular to a joint used in one of a water inlet or water outlet of a filter cylinder or a filter casing, wherein the joint can be installed rapidly in a prepared water inlet or water outlet of a filter cylinder or filter casing. The joint offers the functions of quick combination with a water inlet or water outlet of a filter cylinder or filter casing and receiving water quickly.

BACKGROUND OF THE INVENTION

A water filter comprises a filter cylinder installed with a filter material and a filer casing screwed on the filter cylinder. Or a water filter is formed by a filter material installed in a sealed container. Water flows into the water filter from the filter casing or a water inlet of the sealed container, and flows through the filter material of the filter cylinder or the sealed container. Then water is drained out from a water outlet of the filter casing or the sealed container to be used. Both the water inlet and water outlet of the filter casing or the sealed container are installed separately in a joint for connecting with a water tube conveniently. Therefore, no matter a removable filer material of the filter cylinder or a non-removable filter material of the sealed container, the water inlet or water outlet is necessary to be installed. Besides, the joint is also necessary for the water inlet or water outlet in order to install a water tube conveniently.

Three ways are used in the prior art joint connecting with a water inlet or water outlet of a water filter, which are described as the followings.

Referring to FIGS. 1 and 2, the first prior art is a screw connection method in that a joint is connected with a water filter. The inner threads 100, 110 are separately formed on the inner diameters of a water inlet 10 or a water outlet 11 of filter casing 1 or a sealed container; and outer threads 20, 21 are formed on the outer sides of two axial ends of the front side and the back side of a joint 2, and then the back end of the joint 2 is screwed with a screw nut 22 by using the same thread pitch. Furthermore, the screw nut 22 is screwed with the outer thread 21. After the T shape sleeve 30 is assembled to a water tube 3 by a T shape sleeve 30 being inserted into one end of the water tube 3, a screwing effect of a screw nut 22 which is screwed into a joint 2 facilitates a water tube 3 to be assembled to the inner hole of the joint 2 so as to offer a function of connecting another water filter or water inlet and outlet. However, the traditional screw connection method has not only complicated components, but also has a disadvantage of increasing the manufacturing procedure. For more detail, because several layers of waterproof tapes 200, 210 must be covered on each outer thread of each screw connecting position, in order to increase the tightness between the inner thread and the outer thread, the manufacturing procedure becomes more complicated and requires much time and work. In addition, the T shape sleeve 30 installed into the water tube 3 may loose so as to induce a problem of leaking water. Thus, the manufacture cost cannot be reduced greatly, and in operation, the manufacture process is inconvenient and slow in assembly. In a further prior art, inner threads 100, 110 are separately formed on a water inlet 10 or a water outlet 11 of a filter casing 1 or a sealed container. The front and the external side of a joint 2 is formed with an outer thread 23, and the back side of the joint 2 is formed with a polygonal shape 24. By the same thread pitch and the same external diameter of an inner thread and an outer thread, a water inlet 10 and a water outlet 11 can be screwed into one end of the joint 2. Then a T shape sleeve 31 is assembled to the outer side of a water tube 3, and at the same time, a waterproof washer 4 is inserted into the inner hole of the joint 2. The front and the external side of the T shape sleeve 31 are formed with a plurality of tapered claws 310 and a plurality of slits 311 which are axially arranged, so that the front end of the T shape sleeve 31 is elastic to be inserted easily into the outer side of the water tube 3. Then the waterproof washer 4, the T shape sleeve 31 and the water tube 3 are inserted into the inner hole of the joint 2. Finally the raised claws 310 which are on the front and outer side of T shape sleeve 31 are wedged in the joint 2, so that the assembly of the water inlet 10 and water outlet 11 of the sealed container or the filter casing 1 with the water tube 3 is complete, as illustrated in FIGS. 3 and 4. Although the second prior art used in assembling a water tube may have an advantage of rapid assembly, the prior art still has several disadvantages. For more detail, because several layers of waterproof tapes 200, 210 must be covered on each outer thread of each screw connecting position, in order to increase the tightness between the inner thread and the outer thread, the manufacturing procedure becomes more complicated and requires much time and work. In addition, the polygonal shape 24 protrudes out of the the sealed container and the filter casing. As a result, it is easily damaged by collision.

In another prior art, a waterproof washer 4 is installed directly in a water inlet or water outlet of a filter cylinder or filter casing, then a sleeve 5 is pushed into the water inlet or water outlet of filter cylinder or filter casing in force. A C sharp clip is clipped on the round ring tube 5. A periphery of the C shape clip is formed with a plurality of metal elastomers 50. Because each metal elastmore 500 leans toward the same direction, the sleeve 5 can be pushed easily into the water inlet 10 or water outlet 11 of the filter cylinder or filter casing 1. A T shape sleeve 31 is sleeved on the outer side of the water tube 3. The T shape sleeve 31 has the same features of the structure as mentioned above. The front 1 outer wall of the T shape sleeve 31 has a plurality of axially arranged claws 311 and a plurality of slits 310. so that the front end of the T shape sleeve 31 is elastic and thus it can be inserted easily into the exterior of the water tube 3. Then the waterproof washer 4, the T shape sleeve 31 and the water tube 3 are inserted into the round ring tube 5. Finally, the claws are in the front end and exterior of T shape sleeve 31 are locked to the sleeve 5, so that the assembly of the water inlet 10 and water outlet 11 of the sealed container or the filter casing 1 with the water tube 3 is completed as illustrated in FIGS. 5 and 6. The method has a simple structure, but a plurality of metal elastomers 500 must be arranged on the sleeve 5. Besides, each metal elastomer leans toward the same direction in order to reach desirable goals. Otherwise, the water tube 3 is not possible to be installed into the water inlet 10 or water outlet 11 of the filter cylinder or filter casing 1. In addition, since the sleeve 5 must be pushed to enter into the water inlet 10 or water outlet 11 of the filter cylinder or filter casing 1 in force, the inner walls of the water inlet 10 or water outlet 11 of the filter cylinder or filter casing 1 are easily damaged for the sake of great pushing force. Meanwhile the damaged inner walls of the water inlet 10 or water outlet 11 of the filter cylinder or filter casing 1 will reduce the assembly of the water tube 3. Thus, it is happened that the sleeve 5 explodes s for the sake of high water pressure.

The present invention is modified for improving the disadvantages of the prior art water inlet or water outlet of the filter cylinder, which is based on the manufacture experiences of several decades to follow the principles of economy and efficiency. In assembly, the waterproof washer encloses a front end of the T shape sleeve, and then the T shape sleeve with the waterproof washer is placed into the polygonal hole from the round opening; and then the water tube is placed in T shape sleeve with a part of the water tube protruding out, and then the joint is installed into a water inlet or water outlet of a sealed container or filter casing. The joint used in one of a water inlet or water outlet of a filter cylinder has several advantages, such as convenient operation, quick combination and high pressure-tolerance.

SUMMARY OF THE INVENTION

Accordingly, the primary object of the present invention is to provide a joint used in one of a water inlet or water outlet of a filter cylinder, or a water inlet or a water outlet of a filter casing. The joint can be assembled rapidly on a water inlet or a water outlet of a filter cylinder or a filter casing so as to reach the goals of convenient operation, quick combination and high pressure-tolerance.

To achieve above objects, the present invention provides a joint used in one of a water inlet or a water outlet of a filter cylinder, or a water inlet or a water outlet of a filter casing. The joint is a round cylindrical tube basically, and comprises at least one first waterproof washer installed near one end of the round cylindrical tube. An outer thread is formed on an outer surface of the round cylindrical tube and behind the waterproof washer. A polygonal hole is opened away from the washer and is formed in the front and the interior of the round cylindrical tube. Thereby the round cylindrical tube can be screwed into the water inlet or water outlet of filter cylinder or filter casing so as to be matched to the size of the periphery of the filter cylinder or filter casing, and the waterproof washer is able to seal the gap by screwing force so as to reach the goal of waterproof. Then the T shape sleeve 31 is installed in a water tube, and the joint is installed into a water inlet or water outlet of a sealed container or a filter casing. Therefore, in assembly, the waterproof washer encloses a front end of the T shape sleeve and then the T shape sleeve with the waterproof washer is placed into the polygonal hole from the round opening; and then the water tube is placed in T shape sleeve with a part of the water tube protruding out, and then the joint is installed into a water inlet or water outlet of a sealed container or filter casing.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
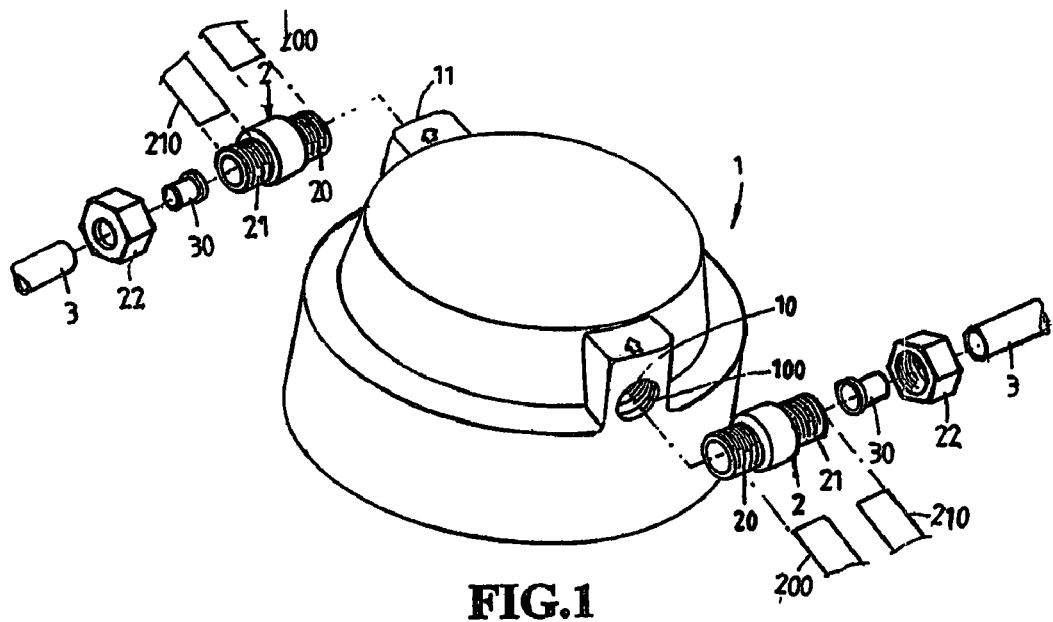
FIG. 1 is an exploded perspective view of the water inlet or water outlet of filter cylinder or filter casing and the joint of the first prior art.
Figure 2:
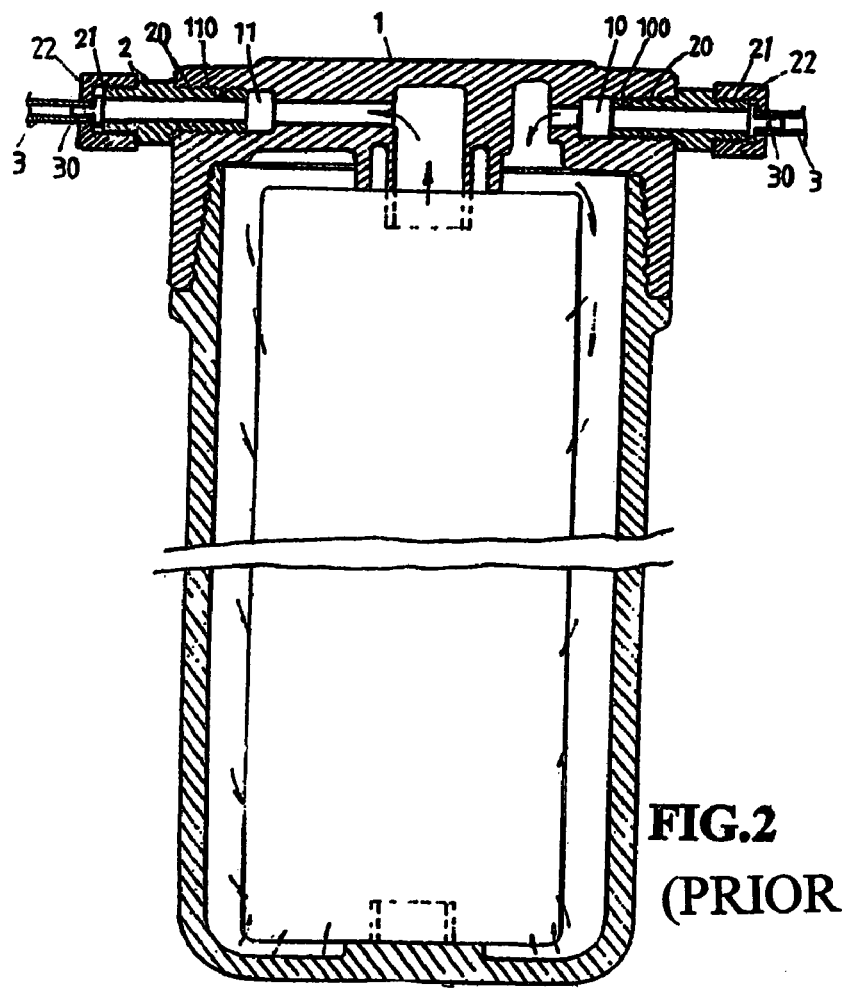
FIG. 2 is an assembled cross sectional view of the water inlet or water outlet of filter cylinder or filter casing and the joint of the first prior art.
Figure 3:
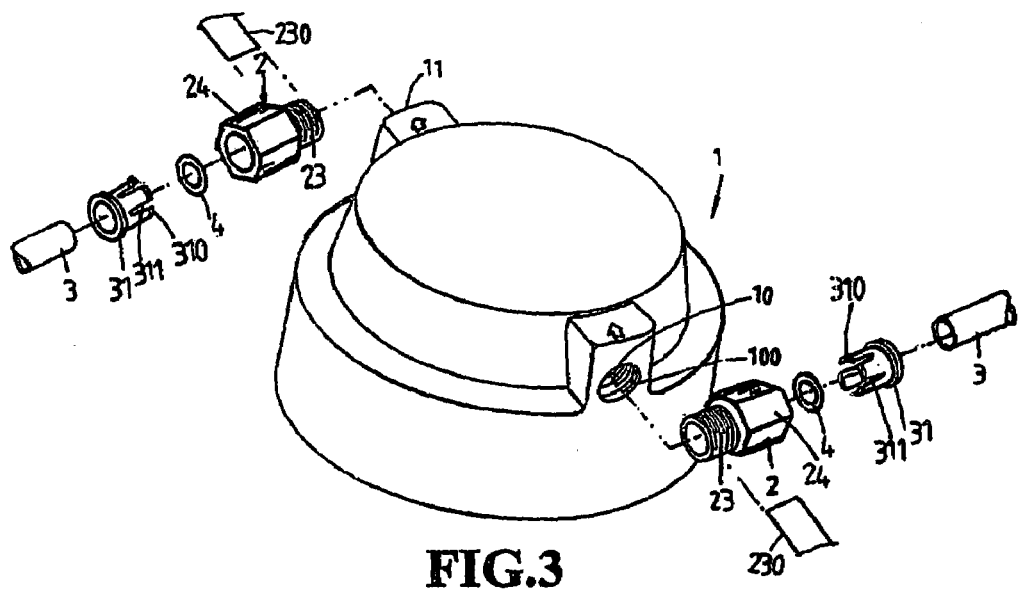
FIG. 3 is an exploded perspective view of the water inlet or water outlet of filter cylinder or filter casing and the joint of the second prior art.
Figure 4:
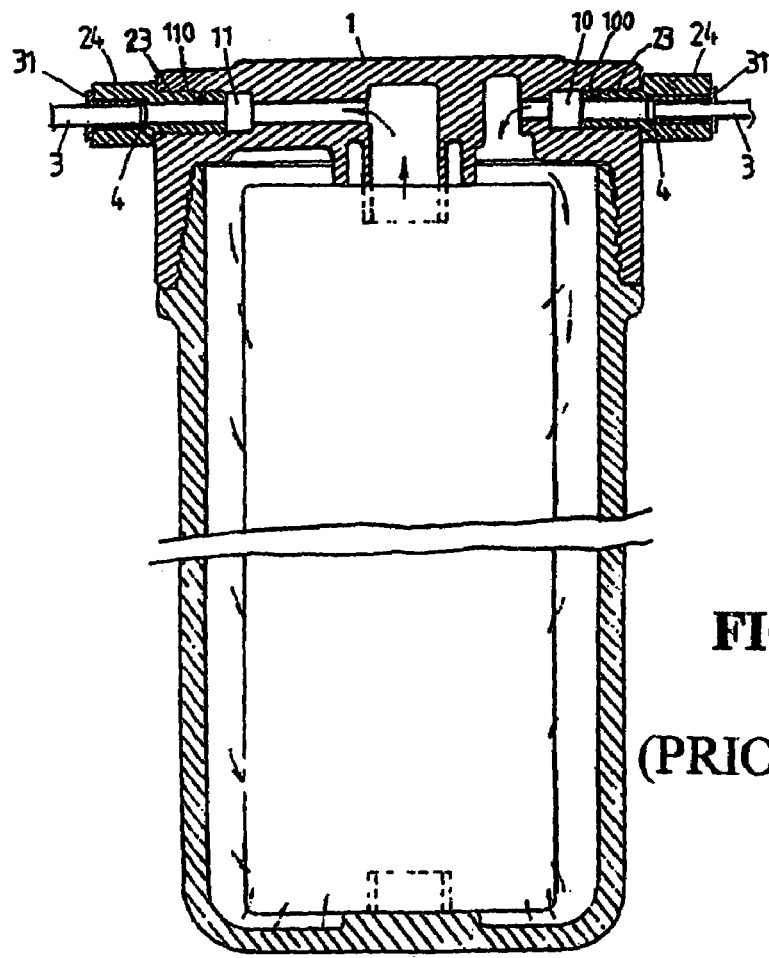
FIG. 4 is an assembled cross sectional view of the water inlet or water outlet of filter cylinder or filter casing and the joint of the second prior art.
Figure 5:
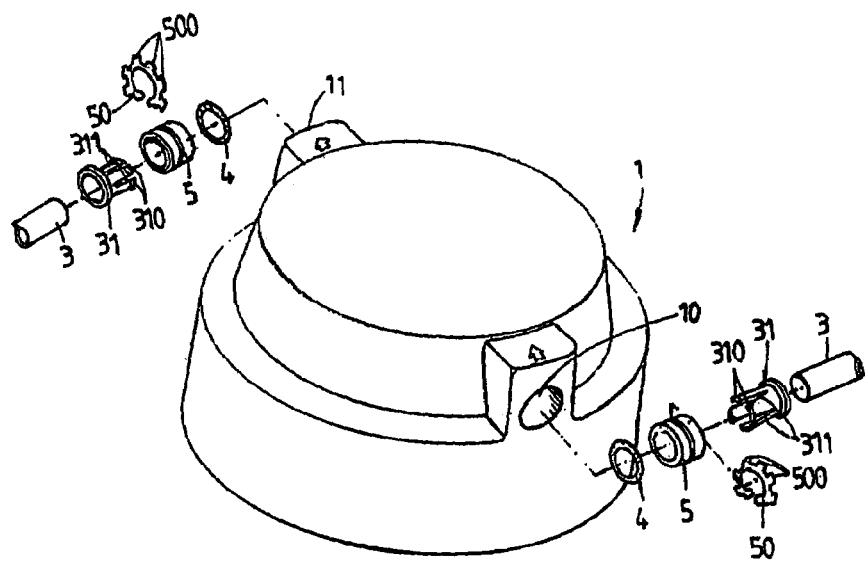
FIG. 5 is an exploded perspective view of the water inlet or water outlet of filter cylinder or filter casing and the joint of the third prior art.
Figure 6:
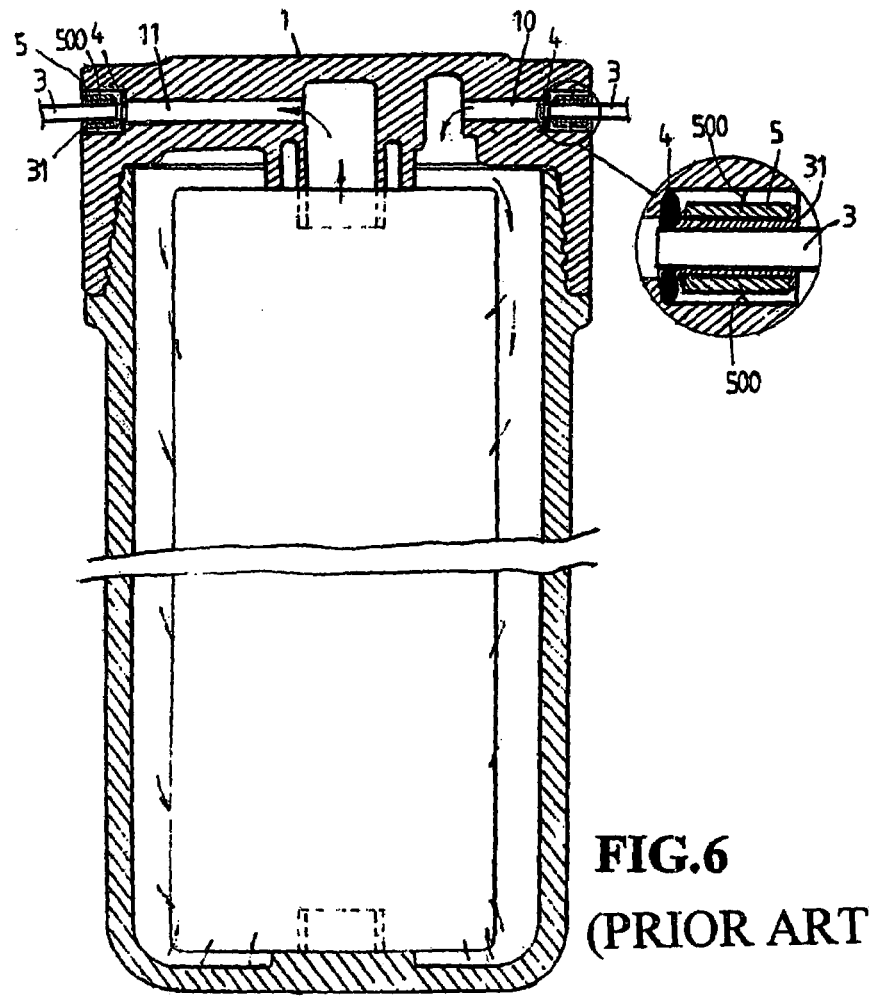
FIG. 6 is an assembled cross sectional view of the water inlet or water outlet of filter cylinder or filter casing and the joint of the third prior art.
Figure 7:
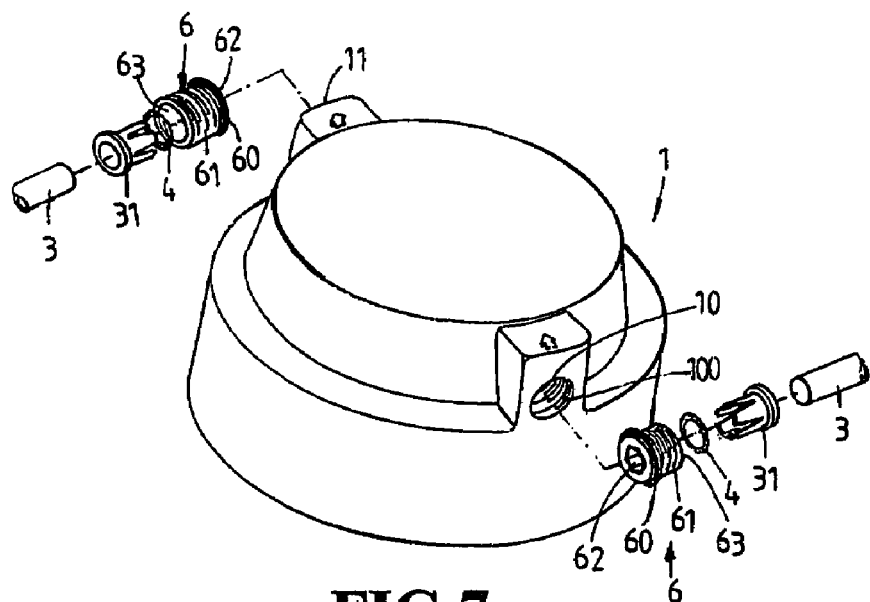
FIG. 7 is an exploded perspective view of the water inlet or water outlet of filter cylinder or filter casing and the joint of the present invention.
Figure 8:
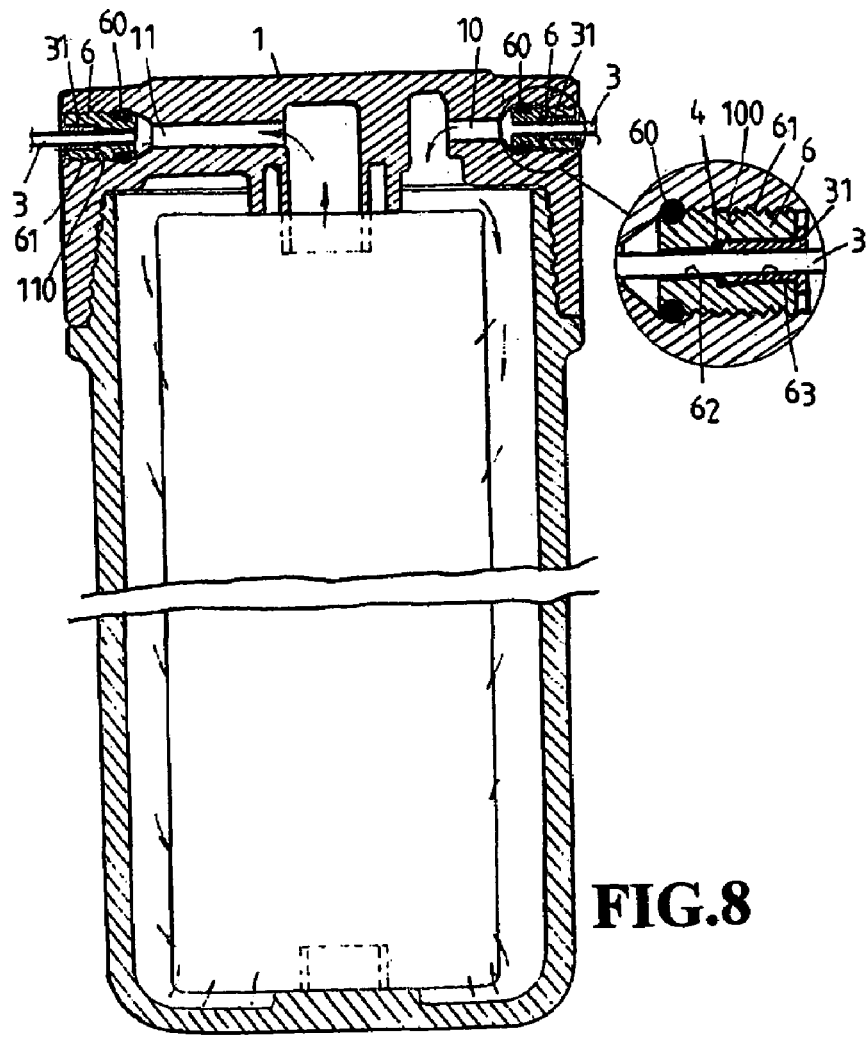
FIG. 8 is an assembled cross sectional view of the water inlet or water outlet of filter cylinder or filter casing and the joint of the present invention.

Referring to FIGS. 7 and 8, the exploded perspective view and schematic cross view of the present invention is illustrated. The joint comprise a round cylindrical tube 6; at least one first waterproof washer 60 installed near one end of the round cylindrical tube 6; an outer thread 61 on an outer surface of the round cylindrical tube 6 and behind the waterproof washer 60; a second waterproof washer 4, a T shape sleeve 31 with T shape lateral sides; and a water tube 3.

An outer diameter of the outer thread 61 is matched to the size of the inner threads 100, 110 of the water inlet 10 or water outlet 11 of filter cylinder or filter casing 1. An opening of the round cylindrical tube 6 far away from the washer 60 is a round opening 63 and an interior of the round cylindrical tube 6 is formed as a polygonal hole 62. Thereby the round cylindrical tube 6 can be screwed into the water inlet 10 or water outlet 11 of filter cylinder or filter casing 1 so as to be matched to the periphery of the filter cylinder or filter casing. Then the waterproof washer 4 enclosed a front end of the T shape sleeve 31 and then the T shape sleeve 31 with the waterproof washer 4 is placed into the polygonal hole 62 from the round opening 63. Then the water tube 3 is placed in the T shape sleeve 31 with a part of the water tube 3 protruding out.

In the present invention, a front end of the T shape sleeve 31 has a plurality of tapered claws 311 which are axially arrange so that the T shape sleeve 31 is elastic. The waterproof washer 4 encloses the front end of the T shape sleeve 31 so as to be expanded by the tapered claws 311. Thereby the round cylindrical tube 6 has a preferred waterproof effect.

Other than being screwed into the water inlet 10 or water outlet 11 of filter cylinder or filter casing 1, the round cylindrical tube 6 of the present invention is tightly engaged to the water inlet 10 or water outlet 11 of filter cylinder or filter casing 1 by the waterproof washer 60 to tightly combine to inner walls of the water inlet 10 or water outlet 11 and screwing effect of the outer thread 61 and inner thread 100 is achieved. Thus, the assembly work can be positioned easily and rapidly to have the effect of waterproof and high pressure-tolerance.

Therefore, from above description, it is known that a joint can be installed fast and conveniently in one of a water inlet or water outlet of a filter cylinder, or a water inlet or a water outlet a filter casing. Other than having several advantages, such as easy composition, low cost, quick combination, convenient operation and receiving water quickly, the joint can tolerate high water pressures by screwing effect of the outer thread and inner thread.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A joint used in one of a water inlet or water outlet of a filter cylinder, or a water inlet or a water outlet of a filter casing; the joint being a round cylindrical tube, comprising:

at least one first waterproof washer installed near one end of the round cylindrical tube; an outer thread on an outer surface of the round cylindrical tube and behind the waterproof washer; an outer diameter of the outer thread being matched to the inner threads of the water inlet or water outlet of filter cylinder or filter casing;

an opening at a location far away from the washer being a round opening and an interior of the round cylindrical tube being formed as a polygonal hole; thereby the round cylindrical tube can be screwed into the water inlet or water outlet of filter cylinder or filter casing so as to be matched to the periphery of the filter cylinder or filter casing;

a front end of a T shape sleeve having a plurality of tapered claws which are axially arrange so that the T shape sleeve being elastic; a second waterproof washer 4 enclosing the front end of the T shape sleeve so as to be expanded by the tapered claws; and a water tube;

wherein in assembly, the second waterproof washer encloses a front end of the T shape sleeve and then the T shape sleeve with the waterproof washer is placed into the polygonal hole from the round opening; and then the water tube is placed in T shape sleeve with a part of the water tube protruding out.

\* \* \* \* \*